United States Patent [19]

Robbins

[11] Patent Number: 4,821,097
[45] Date of Patent: Apr. 11, 1989

[54] APPARATUS AND METHOD FOR PROVIDING DIGITAL AUDIO ON THE SOUND CARRIER OF A STANDARD TELEVISION SIGNAL

[75] Inventor: Clyde Robbins, Maple Glen, Pa.

[73] Assignee: General Instrument Corporation, New York, N.Y.

[21] Appl. No.: 22,380

[22] Filed: Mar. 5, 1987

[51] Int. Cl.⁴ .............................................. H04N 7/04
[52] U.S. Cl. .................................... 358/143; 380/10; 380/15
[58] Field of Search .................... 380/10, 15; 358/143–145, 86

[56] References Cited

U.S. PATENT DOCUMENTS

| | | | |
|---|---|---|---|
| Re. 31,735 | 11/1984 | Davidson | 358/124 |
| 4,215,366 | 7/1980 | Davidson | 358/124 |
| 4,266,243 | 5/1981 | Shutterly | 380/20 |
| 4,295,223 | 10/1981 | Shutterly | 358/145 |
| 4,353,088 | 10/1982 | van Toonder et al. | 380/15 |
| 4,402,010 | 8/1983 | Vogelman | 358/133 |
| 4,405,944 | 9/1983 | Eilers et al. | 358/144 |
| 4,513,315 | 4/1985 | Dekker et al. | 358/86 |
| 4,513,327 | 4/1985 | Takahashi et al. | 358/310 |
| 4,555,730 | 11/1985 | Briggs | 358/144 |
| 4,605,950 | 8/1986 | Goldberg et al. | 358/11 |
| 4,608,456 | 8/1986 | Paik et al. | 380/28 |
| 4,644,580 | 2/1987 | Akagane | 358/144 |
| 4,656,629 | 4/1987 | Kondoh et al. | 358/143 |
| 4,679,085 | 7/1987 | Johnson et al. | 358/143 |
| 4,682,360 | 7/1987 | Frederiksen | 380/10 |
| 4,684,981 | 8/1987 | Toyoshima et al. | 358/86 |
| 4,691,234 | 4/1987 | Albean | 358/144 |
| 4,710,814 | 12/1987 | Gassmann et al, | 358/143 |
| 4,745,476 | 5/1988 | Hirashima | 358/143 |

OTHER PUBLICATIONS

*Understanding Data Communications*, published by Texas Instruments Learning Center, 1984, pp. 4–4 to 4–12.

Primary Examiner—Salvatore Cangialosi
Attorney, Agent, or Firm—Kramer, Brufsky & Cifelli

[57] ABSTRACT

A television transmission system replaces the standard FM audio portion of a television signal with digital audio. Three digital audio channels are time division multiplexed on the sound carrier, using combined multi-phase and AM modulation. The audio signals are digitized using adaptive delta modulation techniques. Video vertical and horizontal framing, as well as the audio carrier phase reference, audio data bit time and frame reference, and various control data is carried using AM modulation. The digital audio information is carried using multi-phase modulation. The composite data stream may be serially encrypted to provide security and prevent unauthorized reproduction of the video and/or audio portions of the television signal.

47 Claims, 9 Drawing Sheets

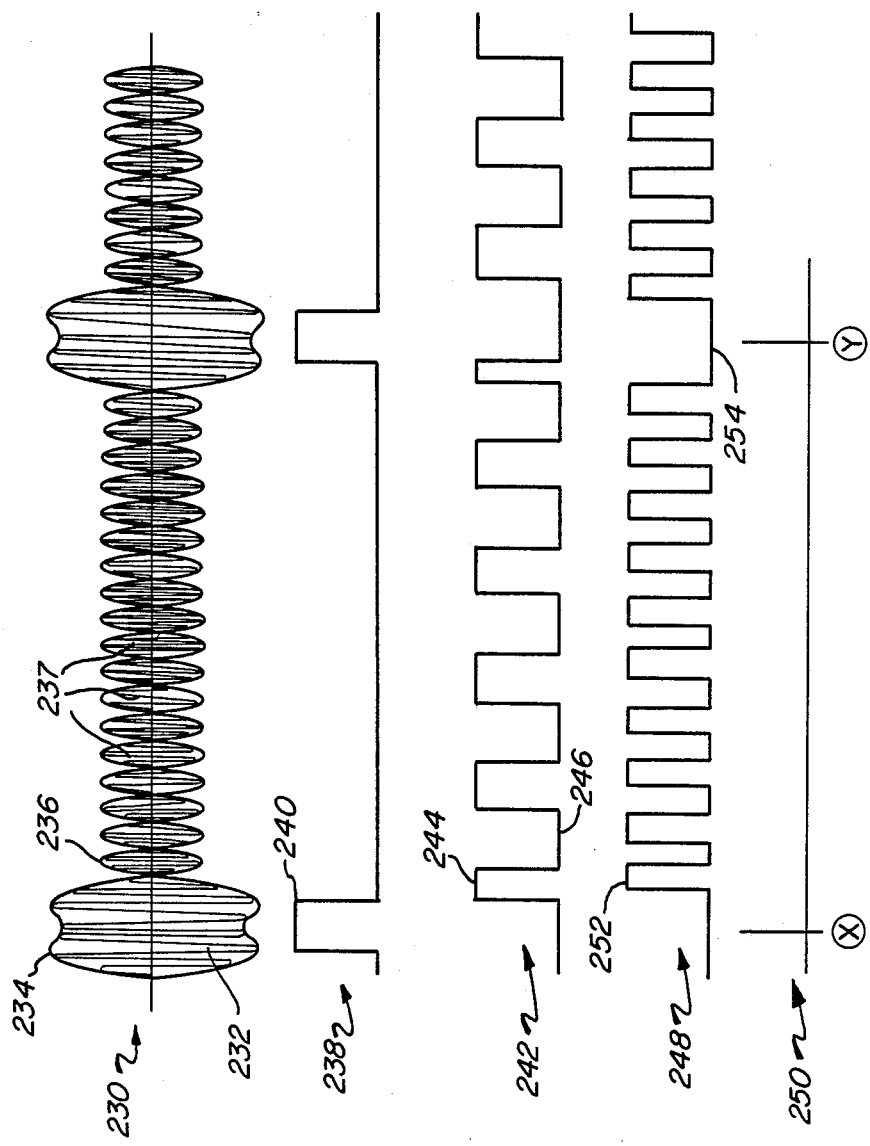

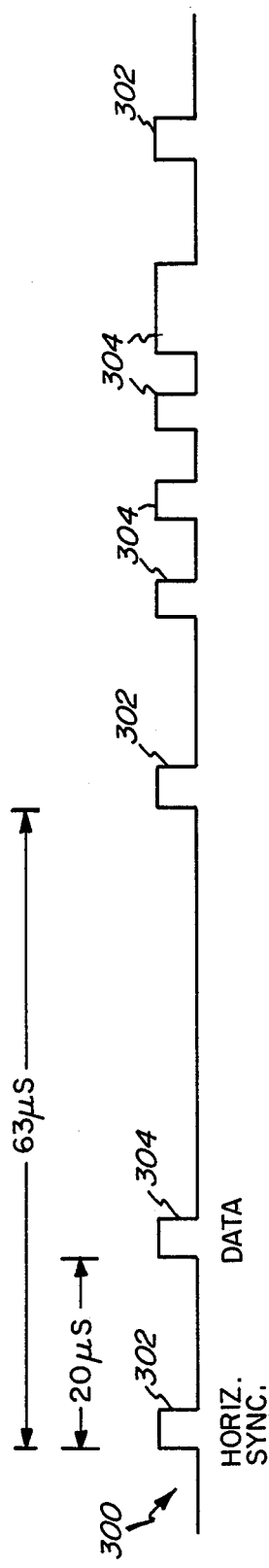
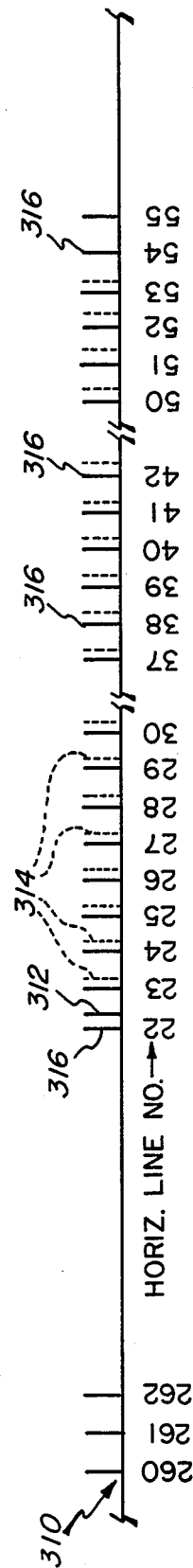
FIG. 10
FIG. 11

APPARATUS AND METHOD FOR PROVIDING DIGITAL AUDIO ON THE SOUND CARRIER OF A STANDARD TELEVISION SIGNAL

BACKGROUND OF THE INVENTION

The present invention relates to television broadcasting and reception, and more particularly to a method and apparatus for providing high quality digital sound signals within the audio portion of a standard television signal.

New digital techniques for the reproduction of sound provide performance that is far superior to analog techniques which have been used in the past. An example of high fidelity sound reproduction using digital techniques can be found in the compact disc technology which has recently enjoyed tremendous success as an alternative to photograph records and tapes. Digital recording and playback techniques provide reproduction of music that is extremely realistic and absent from background noise and distortions which have plagued other high fidelity sound reproduction systems currently in wide scale use.

Recent advances in television technology have enabled the transmission of stereophonic sound together with a conventional television picture transmission. Known systems have used analog techniques in connection with the stereophonic sound reproduction. See, for example, commonly assigned and co-pending U.S. patent application Ser. No. 06/816,133 filed Jan. 3, 1986 and entitled "Apparatus and Method for Stereo Television Sound".

A difficulty with providing digital audio in television broadcasting has been the incorporation of the digital signals within the standard television signal without interfering with the video portions of the television signal or appreciably affecting the quality or type of picture reproduced by conventional video circuits. In addition, any television distribution system which transmits digital audio data (such as a cable television system) must be such that the transmitted television signal can be received and reproduced on the millions of television sets already in existence which use conventional analog sound circuits. Thus, such things as the channel width of six megahertz (MHz) for each channel within the television signal spectrum, the aspect ratio of four to three, the video bandwidth of 4.25 MHz, the horizontal and vertical scanning rates of 15.734 kilohertz (KHz) and 60 hertz (Hz), respectively, and the number of scanning lines per frame at 525 cannot be changed, subject to narrow tolerances.

The present invention provides a method and apparatus for incorporating digitized audio data within the second carrier of a standard television signal in a manner such that the signal will be recoverable for reproduction of the transmitted program on black and white and color television sets already in existence.

SUMMARY OF THE INVENTION

In accordance with the present invention, a method and apparatus are provided for transmitting, receiving, and reproducing digital audio signals in the sound carrier of a standard television signal. An audio signal is digitized using, for example, adaptive delta modulation techniques. Several channels of audio information, such as left and right stereo channels and a second audio program ("SAP") channel can all be digitized and incorporated onto the television signal sound carrier. The digitized audio signal is modulated using multi-phase modulation on the sound carrier portion of a television signal. The modulated sound carrier is then converted to an intermediate frequency, and summed with the AM modulated video portion of the television signal to which the digitized audio signal corresponds to produce a composite IF output signal.

The sound carrier is amplitude modulated with a pilot signal for use as a phase and timing reference in the multi-phase modulated signal. The pilot signal can comprise, for example, a pulse added to the sound carrier once for each horizontal line contained in the television signal. The pilot signal can be added to a portion of the sound carrier corresponding to the end of active video on each horizontal line.

In order to broadcast the composite IF output signal, it can be converted to an RF output signal and transmitted on a television signal channel. The RF output signal can be transmitted through the air, via satellite, over a cable television system, or any combination thereof. In the instance where the television signal contains premium programming such as that which would be offered on a pay-per-view basis via satellite or a cable television system, the video portion of the signal can be scrambled by suppressing the horizontal synchronization pulses thereof. Such scrambling will not interfere with the proper transmission and subsequent reception and reproduction of the digital audio signal. The digital audio data can also be encrypted to prevent unauthorized reproduction of the audio portion of a television program.

In accordance with the present invention, the adaptive delta modulation used to digitize the audio signal uses an audio sampling rate that is an integer factor of the sound carrier center frequency. Further, the sound carrier center frequency is phase locked to a horizontal scan rate used in reproducing the video portion of the television signal. In a preferred embodiment, the horizontal scan rate is approximately 15.734 KHz and the sound carrier center frequency is 4.5 MHz.

In order to provide stereo left, stereo right, and second audio program ("SAP") audio channels, these three channels can be time division multiplexed on the audio carrier of the television signal. The digitizing of the three audio channels can be accomplished by sampling the left and right stereo audio channels at an adaptive delta modulation rate of 13 times the horizontal scan rate, and sampling the SAP channel at an adaptive delta modulation rate of 11 times the horizontal scan rate. The composite data stream may be serially encrypted for security purposes.

The present invention also provides a method and apparatus for receiving the television signal with the digital audio data incorporated therein and reproducing the sound which the digital signals represent. A multi-phase demodulator demodulates a received television signal to retrieve the audio channel data. The data is presented to an adaptive delta modulation decoder which produces conventional audio output signals for input to an audio amplifier or, alternately, a television modulator which inputs the audio signals (not in analog from) to a television for sound reproduction in a conventional manner.

BRIEF DESCRIPTION OF THE DRAWINGS

FIG. 8 depicts various waveforms including the multi-phase modulated input, detected peak AM, detected most significant bit, and detected least significant bit information from a television signal having digital audio data in accordance with the present invention;

FIG. 10 is a timing diagram of horizontal synchronization and data pulses; and

FIG. 11 is a timing diagram of AM modulated data within a portion of a video information frame.

DETAILED DESCRIPTION OF THE INVENTION

Figure 1:
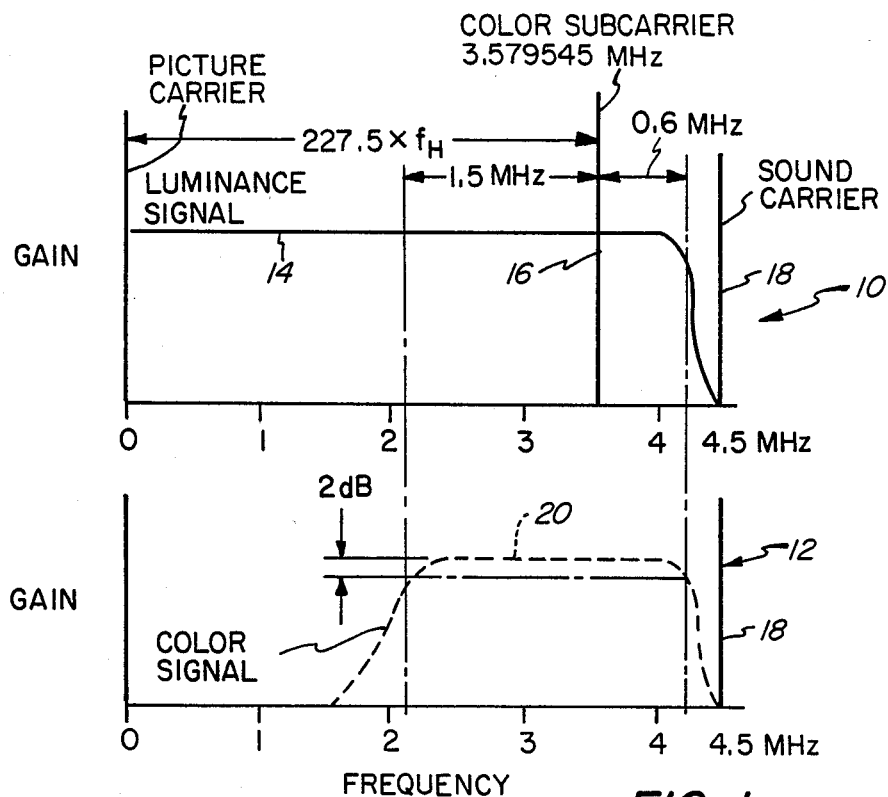
FIG. 1 is a diagram showing the complete video spectrum of a standard color television transmission.

FIG. 1 illustrates the complete video spectrum of a standard color television transmission. The luminance signal 14 is shown in graph 10, and the color or "chrominance" signal 20 is shown in graph 12. A color subcarrier 16 is transmitted at 3.579545 MHz with sidebands that extend 0.6 MHz above and 1.5 MHz below this frequency. The sound carrier 18 is centered at 4.5 MHz.

The use of the specific frequency of 3.579545 MHz for the chrominance subcarrier results in an interleaving of the luminance and chrominance signals as is well known in the art. This interleaving of signals makes it possible to transmit both the luminance and chrominance signals within the same channel width used for the transmission of a monochrome television signal.

Figure 2:
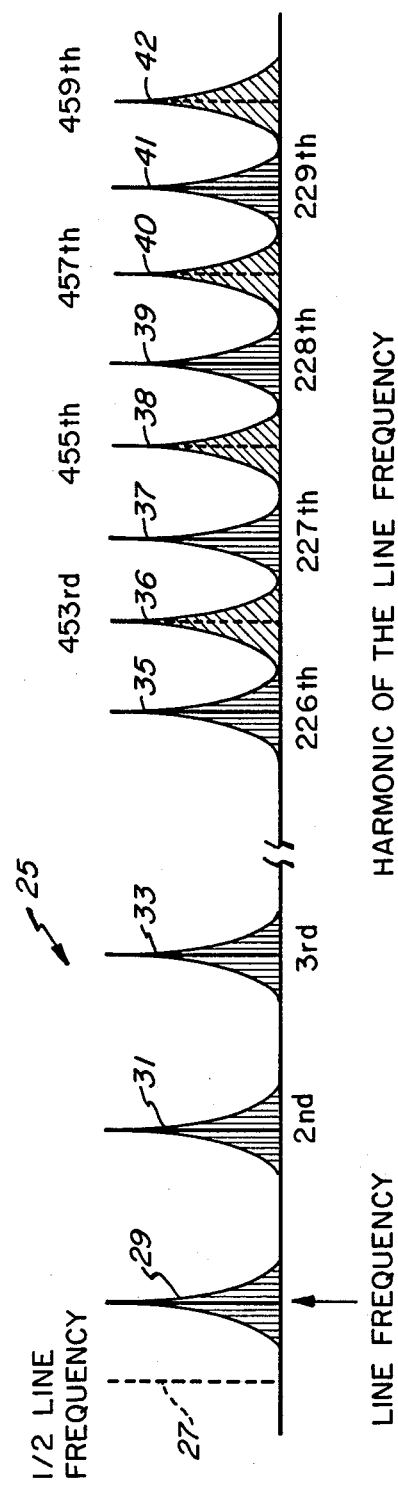
FIG. 2 is a graphical representation showing the interleaving of the luminance and digital audio signals with color signal in the frequency spectrum of a television signal.

In standard monochrome television signal transmission, the transmitted signal is comprised of recurring wave forms having frequencies that are harmonics of the horizontal line scanning frequency. Thus, the frequency spectrum contains a concentration of energy at each harmonic, i.e., at whole multiples of the horizontal line frequency. FIG. 2 illustrates the frequencies at which such concentrations of energy occur. A first concentration appears at the line frequency 29. Subsequent concentrations of energy are centered around the second harmonic 31, the third harmonic 33, and so forth as shown at the 226th harmonic 35, 227th harmonic 37, 228th harmonic 39, and 229th harmonic 41. As shown in FIG. 2, nearly half of the video spectrum is unused by the luminance signal which has harmonics at whole multiples of the line frequency. Therefore, in providing color television transmission, it was possible to interleave the chrominance signal with the luminance signal by placing the chrominance information at odd multiples of one-half the line frequency. This was possible because the scanning rates for the chrominance signal and luminance signal are the same (approximately 15.734 KHz). Interleaving of the chrominance signals is shown in FIG. 2 at the 453rd harmonic 36 of half the line frequency 27, as well as at the 455th harmonic 38, 457th harmonic 40, and 459th harmonic 42. Those skilled in the art will recognize that luminance and chrominance signal energy will continue along the frequency spectrum at harmonics above those shown in FIG. 2.

The intent of the present invention is to provide digital audio in the sound carrier of a standard television signal in such a manner that the audio signals will not interfere with the video portions of the television signal, thereby providing compatibility with the video processing stages of standard television receivers. In order to do this, the digital audio signals are synchronized with the horizontal line frequency so that the harmonics of the modulated audio signals will appear in registration with the luminance portions of the television signal frequency spectrum. Thus, the digital audio signals will be interleaved with the color signals and will not interfere with the color reproduction in a video program.

In order to accomplish the objective of the present invention, the stereo left, stereo right, and SAP audio channels are time division multiplexed on the 4.5 MHz audio carrier of a standard television signal using combined multi-phase modulation and Am modulation. The 4.5 MHz intercarrier is phase locked to the video horizontal scan rate of 15.734 KHz. In the preferred embodiment, the audio signals are digitized using adaptive delta modulation ("ADM") techniques and particularly, the ADM system proposed by Dolby Laboratories in a paper entitled "Recent Developments in Digital Audio Techniques", K. J. Gundry, D. P. Robinson, and C. C. Todd, Dolby Laboratories, San Francisco and London, presented at the 1984 NCTA Show, which paper is incorporated herein by reference. An integrated circuit chip for providing Dolby ADM decoding is available from Signetics Corporation under Model No. NE5240. Also pertinent and incorporated herein by reference is a paper entitled "Digital Audio for Cable Television", Clyde Robins, NCTA Technical Papers, Mar. 15–18, 1986.

The adaptive delta modulation audio sampling rate used in digitizing the audio data in the preferred embodiment of the present invention is an integer factor of the intercarrier frequency. Three digital components are established for each digitized channel in the Dolby ADM technique. These are amplitude information, frequency companding data, and amplitude companding data. In the best mode embodiment, the digitized audio is transmitted via multi-phase modulation on the aural carrier. Forty-four bits of data are transmitted in each horizontal line. The first four bits are used as preamble for bit synchronization. The preamble is transmitted with a unique phase and amplitude, identifying it as a synchronization symbol.

As noted above, three channels of digital audio are preferably transmitted; namely, stereo left, stereo right, and second audio program channels. The left and right stereo channels each require 13 bits of digitized (ADM) data for each horizontal line of video in the television signal, and one bit per channel per line for frequency and amplitude companding data. The SAP channel requires 11 bits of digitized audio data per horizontal line and one bit per line for frequency and amplitude companding data. This bit distribution is summarized in Table 1.

TABLE 1

AUDIO DATA FRAME

| Number of Bits | Bits | Data |
|---|---|---|
| 13 | 0–12 | left audio |
| 1 | 13 | left audio companding |
| 13 | 14–26 | right audio |
| 1 | 27 | right audio companding |
| 11 | 28–38 | SAP audio |
| 1 | 39 | SAP audio companding |
| 40 bits total | | |

The horizontal scan rate ("$f_H$") in a conventional NTSC color television signal is 15.734264 KHz. The audio intercarrier is 286 times the horizontal scan rate, or 4.5000 MHz. Factors of the audio intercarrier are 2, 11, and 13 ($2 \times 11 \times 13 = 286$). Thus, as noted above, the adaptive delta modulation audio sampling rates work out to be integer factors of the intercarrier frequency.

The modulation rate of the multi-phase modulated audio data is $22 \times f_H$, which provides 22 "symbol times" pre horizontal line. Thus, there will be 13 intercarrier cycles per symbol time ($13 \times 22 = 286$). The multi-phase modulation provides two bits of data per symbol, which results in the transmission of 44 audio data bits in each horizontal line. This translates to a bit rate of 692.3 kilobits per second ("KBPS"). Using non-return to zero ("NRZ") coding makes the maximum symbol transition rate one-half of the symbol rate or 11 $f_H$. The Nyquist required bandwidth is ±173.07 KHz.

In accordance with the bit distribution for the audio data shown in Table 1, the stereo audio delta modulation sampling rate for each of the left and right channels in the preferred embodiment is 13 $f_H$. The second audio program delta modulation sampling rate is 11 $f_H$. Finally, the adaptive companding sampling rate is one-half $f_H$. In the Dolby ADM system, both amplitude and frequency companding data are used. In the present implementation of Dolby ADM, the companding bits provided in each horizontal line are alternated between amplitude data and frequency data. Each line contains either amplitude or frequency companding data, and the contents of sequential lines alternate from one line to the next. Thus, the adaptive companding sampling rate for each type of companding data can be half the horizontal scan rate.

The audio data is carried by the aural intercarrier of a television signal using multi-phase modulation. The same carrier uses AM modulation for video vertical and horizontal framing, as well as the audio carrier phase reference, and audio data bit time and frame reference. When the present invention is used in connection with a cable television system, program identifications and decryption seeds are also carried on the aural intercarrier using AM modulation. In the cable television environment, it is advantageous to encrypt the audio data, and the composite data stream may be serially encrypted so that only authorized subscribers will be able to recover and reproduce the digital audio programming.

In a cable television system, digital audio may be transmitted in accordance with the present invention along with a video signal that is scrambled using, e.g., conventional 6/10 db dynamic sync suppression techniques and/or video inversion scrambling systems. Those skilled in the art are well aware of these and other scrambling systems. When using sync suppression scrambling, the timing recovery signals sent as AM on the sound carrier may be offset in time from the video, increasing the security of the video signal, while making the sound unrecoverable by unauthorized boxes.

The AM modulated data in the signal transmitted from the cable television headend to subscriber converters contains 16 bits of data for 6/10 db sync suppression scrambling selection, program specific data such as price, morality rating, and like data as well known in the art. An example of a prior art headend controller which transmits such data is the model AH-4 controller manufactured and sold by the Jerrold Division of General Instrument Corporation.

In accordance with the preferred embodiment of the present invention, 13 new bits of data are appended to the AM data tag to carry seeding and key data for the decryptor, service code data for the digital audio converter, and time shift descrambling data. This data is necessary to enable an authorized digital audio converter to receive, decrypt, and reproduce sound from the digital audio signals transmitted with the television signal. A service code can also be provided in the data that will be read by non-digital audio converters to deauthorize them so that they cannot receive any television program channels carrying digital sound.

When the present invention is used in conjunction with a cable television system, three primary components are used. These are the addressable controller (also referred to as "headend controller"), the headend encoder, and the subscriber converter (also known as the "subscriber terminal"). Both the addressable controller and encoder are present at the headend from which the cable television signals are sent by the cable system operator. The addressable controller controls all subscriber terminals in the cable television system, controls the encoders/decoders associated with the system, configures scrambling modes, service codes, and encryption keys, and orchestrates the dissemination of all decryption keys. The encoder of the present invention is a headend device consisting of a number of subcomponents including an audio digitizer, video scrambler, tag insertion logic, addressable controller interface logic, and modulator circuitry. These components are described below in connection with the description of FIG. 1.

The subscriber converter is a device located at each subscriber's residence and contains an RF converter module, demodulator, addressable controller interface logic, subscriber interface logic, audio decryptor and digital to analog ("D/A") converter, together with a video descrambler and modulator. Each of these elements will be described below in connection with the description of FIG. 5.

In addition to the AM data path, certain data is transmitted over an FM data path from the cable television headend controller to the subscriber converters. This data is typically modulated using frequency-shift keying ("FSK") techniques well known in the art. The model AH-4 addressable controller referred to above is an example of a prior art headend controller which controls data which is both AM modulated for certain tagging data and FSK modulated for encryption data, authorization codes, and the like.

Table 2 lists various terms and their definitions which are used herein in connection with the description of the transmission of data from the headend controller to the encoder and subscriber converters in accordance with the preferred embodiment of the present invention.

TABLE 2

| | |
|---|---|
| AUDIO DECRYPTION KEYS | Set of 8 nibbles transmitted over the FM (FSK) data path to the subscriber terminal (converter) and encoder. The nibbles are used to seed the cryptors in the headend encoder and subscriber terminal decoder. At any one time four of the nibbles are in use. The unused nibbles may be changed out while idle. Data identifying the four nibbles to be used, and the order of usage is transmitted from the headend controller to the encoder, and transmitted from the encoder to the subscriber terminal as AM modulated tag data. |
| KEY USAGE SPEC | Specifies which of the audio decryption keys to use in each of the 4 nibble slots in the subscriber terminal descrambler circuit. Any of the 8 keys can be assigned to any of the 4 slots. This assignment data is sent in bits 16–23 of the AM tag, and is specific to each television program. |
| TAG DECRYPTION KEY | 4 bit nibble sent from the headend controller to the subscriber terminal over the FM data path. This key is used to decrypt the encrypted service code and encrypted seed that is sent in the AM tag. Two tag decryption keys exist in the system, but only one is in use at any time. A key may be changed out when it is not in use. The key that is to be used to decrypt the tag is specified in the tag. |
| VIDEO SERVICE CODE | Service code sent in bits 0–7 of the AM tag, and used to determine authorization for the video portion of the program. A subscriber terminal not authorized for this service code will disallow viewing of the video portion of the program. A non-digital audio subscriber terminal will also use it to allow or disallow viewing (non-digital audio converters should always be deauthorized for digital audio services). |
| AUDIO SERVICE CODE | Service code of the audio portion of the program, sent in an encrypted form, decrypted by tag decryption key. The audio service code is one of the fields of data sent in bits 16–23 of the AM tag. This service code is used by the digital audio converter to determine authorization for stereo audio. If the upper tag bits are not present, the standard service code (bits 0–7) are used for authorization validation, and audio is transmitted in the standard TV format. |
| TIME SHIFT SPEC | Data specifying the magnitude of the time shift between the timing pulses on the sound carrier AM and the sync position in the video. The time shift spec is television program specific, and sent in bits 16–23 of the tag in an encrypted format using the tag decryption key for recovery. Time shifting of the tag can be used in a static mode only, and can change only during program changes (an audio hit will occur when the change takes place). |
| DECRYPTION SEED | 8 bit seed sent in bits 16–23 of the AM tag, used to seed the audio decryption circuitry. The seed is program specific and can change on a dynamic basis. A new seed is put into use in accordance with the timing established by data in the AM tag. The seed is sent in an encrypted format using the tag decryption key for recovery. |

Data communicated over the FM path between the headend controller and the encoder includes a signature used to protect sensitive information communicated over the path, tag and audio encryption keys, key usage identifiers, scrambling mode data including sync suppression mode and time shift specifications, the video and audio service code, and price and morality rating data. Data which pertains to the digital audio service and is sent to the subscriber terminal over the FM path includes a signature used to protect sensitive information communicated over the path, tag and audio decryption keys, and authorization information.

Data sent from the encoder to the subscriber terminal over the AM data path includes video and audio service codes, scrambling mode and timing information (including sync suppression mode and time shift specification), key usage specifications, the decryption seed, and price and morality rating data. Data transmitted in the AM tag can be sent in an encrypted format, requiring the correct tag decryption key in the terminal to properly interpret the data.

Figure 3:
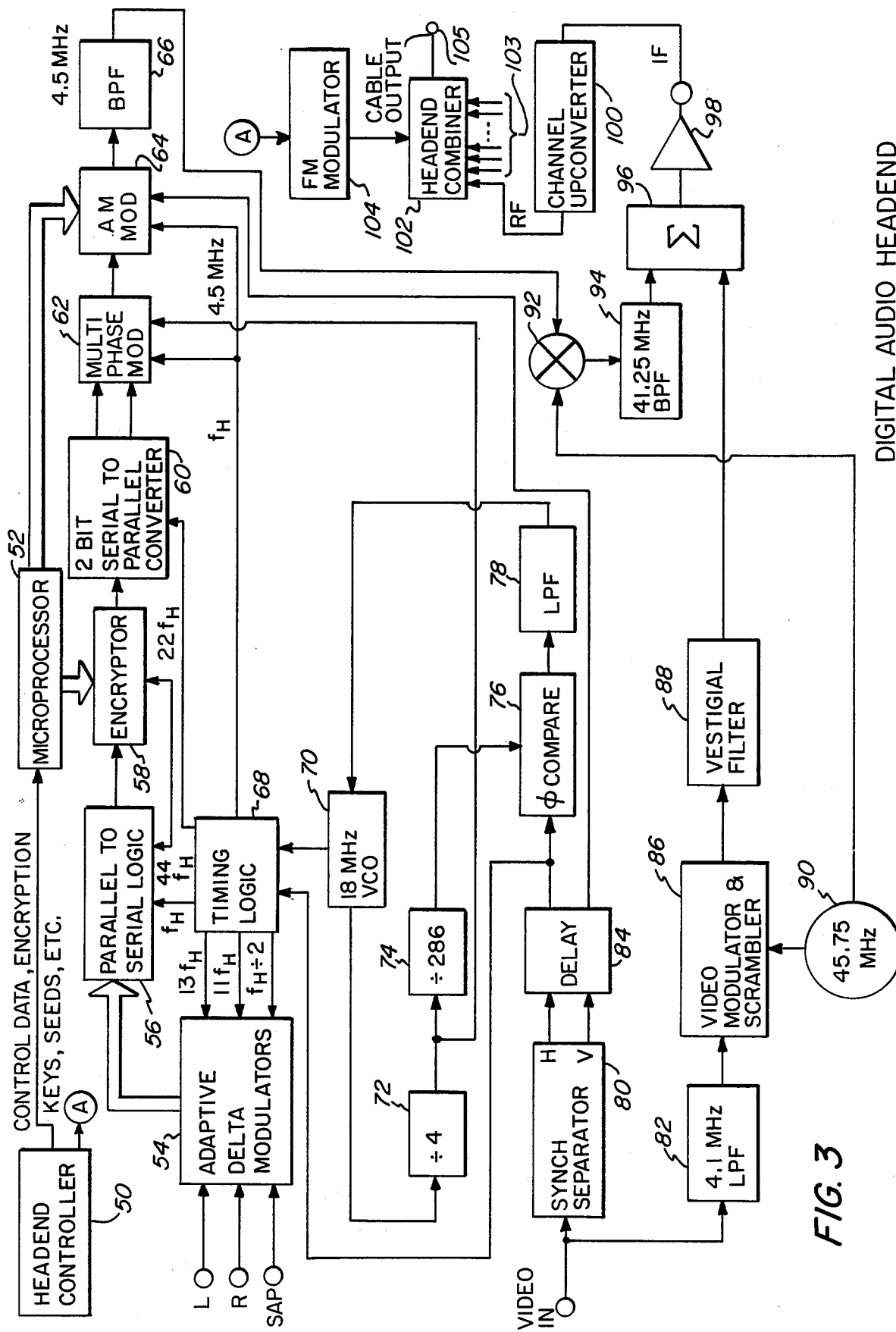
FIG. 3 is a block diagram of a cable television headend which modulates and adds digital audio signals to a television signal in accordance with the present invention.

Turning now to FIG. 3, a headend suitable for use in transmitting digital audio signals over a cable television network in accordance with the present invention is shown in block diagram form. A headend controller 50, such as the Jerrold AH-4 controller, sends various data including control data, encryption keys and seeds to a microprocessor 52. Data to be transmitted on the FM data path is output at terminal "A" to an FM modulator 104 in a conventional manner. Left, right, and SAP audio channels are input to an adaptive delta modulator 54 which digitizes the input audio information and outputs it in parallel format to a parallel to serial logic circuit 56. Circuit 56 can comprise any of the well-known parallel to serial data translation techniques well known in the art. For example, the right, left, and SAP data from adaptive delta modulator 54 can be loaded into shift registers (a separate 13 bit shift register for each of the right and left channel data and an 11 bit shift register for the SAP channel data), and then the outputs of the three shift registers can be input to a parallel load shift register to provide a serial output. The right, left and SAP companding bits from modulator 54 can be loaded into the parallel load shift register via individual flip-flops.

Various timing signals to control adaptive delta modulator 54 and parallel to serial logic 56 are provided by timing logic 68. Timing logic 68 is driven by an 18 MHz voltage controlled oscillator (VCO) 70 and the horizontal synchronization pulses from sync separator 80 after a phase shift provided by delay 84. Timing pulses at a frequency of 13 $f_H$ (for the left and right channel sampling rate), 11 $f_H$ (for the SAP sampling rate), and $f_H/2$ (for the adaptive companding sampling rate) are input to adaptive delta modulator 54. The horizontal scan rate frequency $f_H$ is input directly to parallel to serial logic 56 together with a timing signal at a frequency of 44 $f_H$ which provides the desired bit rate of 44 bits per horizontal line (i.e., 692.3 KBPS). This same signal is also input to an encryptor 58 which is used to encrypt the digital audio data output from parallel to serial logic 56 as well as the control and tagging data which is input to encryptor 58 from headend controller 50 via microprocessor 52.

Figure 9:
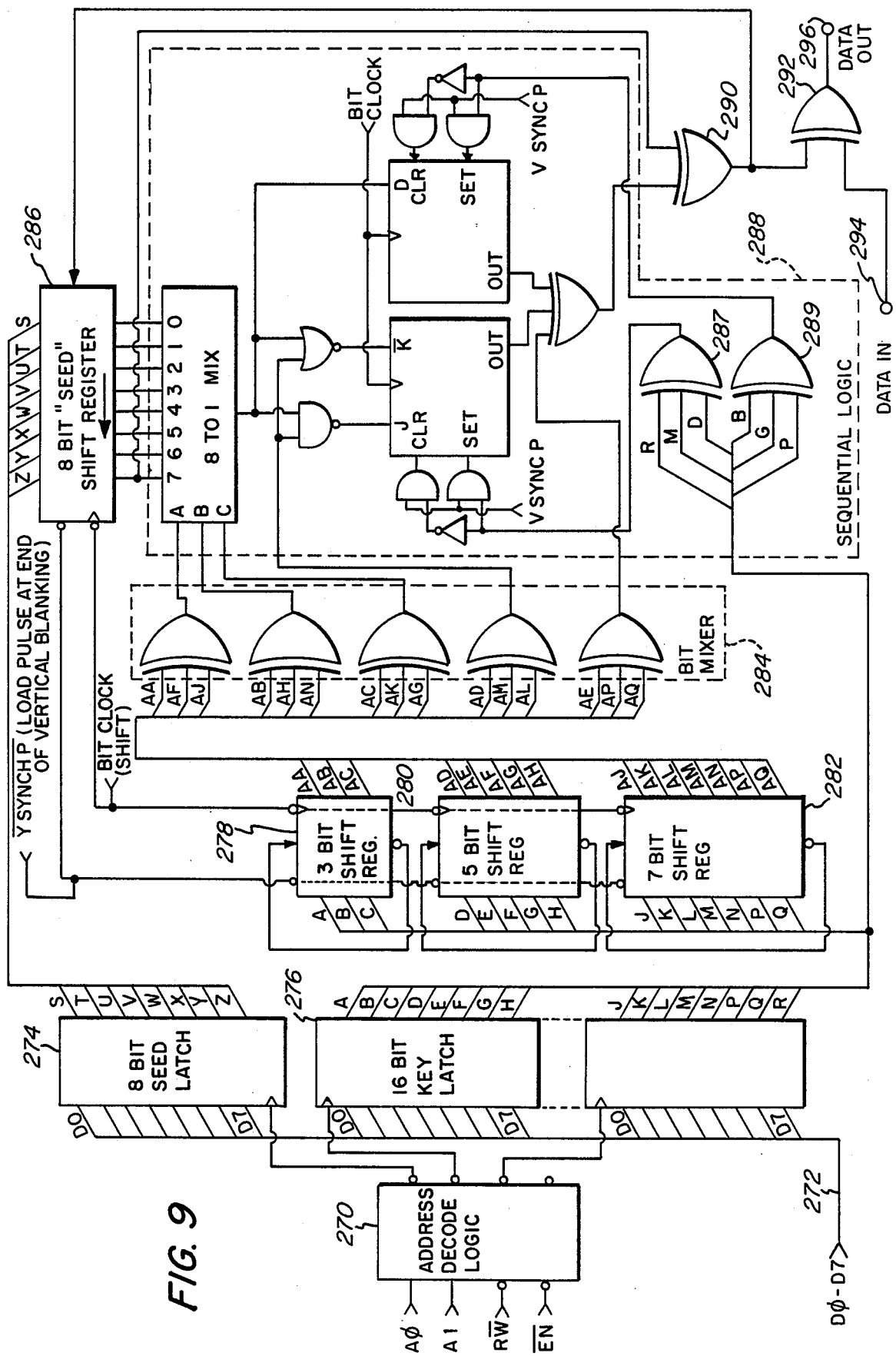
FIG. 9 is a logic diagram of a data encryptor/decryptor used to encode or decode digital data transmitted with a television signal.

The digital audio data, prior to transmission, is encrypted by encryptor 58 using the hardware shown in block diagram form in FIG. 9. The same hardware is used for both encryption and decryption.

Referring to FIG. 9, a 16 bit key is loaded from the microprocessor via data bus 272 to a 16 bit key latch 276. Address decode logic 270 is used by microprocessor 52 to address latch 276 as well as the various other latches contained in the cryptor hardware of FIG. 9. The loaded 16 bit key is used to initialize a set of shift registers 278, 280, and 282 at the beginning of each video field. The shift registers rotate on a bit timing basis, one shift per bit.

A separate 8 bit seed is transmitted in the AM tag data, decrypted, and loaded into an 8 bit seed latch 274 via data bus 272. At the beginning of each video field, the contents of the seed register 274 is loaded into an 8 bit "seed" shift register 286. A bit mixer 284 combines the outputs of the key shift registers 278, 280, and 282 to produce five control signals for the non-linear sequential logic circuitry 288. This logic processes data from the bit mixer 284 and the seen shift register 286 to produce a single bit stream, which is exclusive ORed by an exclusive OR gate 290 with the carryout of the seed shift register to produce the cryption bit stream. The cryption bit stream is shifted back into the serial input of the seed shift register 286. A data signal (which may be either encrypted or clear) is input at terminal 294 where it is exclusive ORed at gate 292 with the cryption bit stream to produce a data output (either decrypted or encrypted) at terminal 296. Thus, any data signal input at terminal 294 is converted from encrypted to clear, or vice versa, and output on terminal 296 by exclusive ORing it with the cryption bit stream.

The preferred embodiment of the digital audio system contains eight cryption key nibbles. Each nibble has four bits. At any one time, on any of the left, right, or SAP audio channels, only four nibbles are in use. The other four nibbles may be changed while out of service.

Encryption keys are distributed over the FM data path. They are transmitted in an encoded format, and are decoded in the subscriber terminal using a decoding algorithm based on the terminal signature which is downloaded during initialization of the terminal. The keys are stored in nonvolatile memory in the encoded format for further protection. A list of keys is periodically transmitted over the FM data path for dissemination as described below.

A descriptor in the AM tag data indicates which four keys to use, and in which combination to effect decryption of the audio data. Two bytes of data are used to described the key usage. The two bytes are broken into four nibbles, each specifying the key to be used in a particular nibble of the key register. Thus, four key nibbles can be used in any order to initialize the key register. The least significant nibble of the first key usage byte specifies the appropriate key nibble (0–7) to use in key latch bits A–D shown in FIG. 9. The most significant nibble of the first key usage byte specifies the key nibble for key latch bits E–H. The least significant nibble of the second key using byte specifies the key nibble for key latch bits J–M. The most significant nibble of the second key usage byte specifies the key nibble for key latch bits N–R.

The encryption seed is the second piece of information required to decrypt the audio data. The seed is a random eight bit data byte originated at the cable television headend and transmitted in the AM tag data in an encrypted format. The seed is decrypted using the tag decryption key specified in the AM tag. The seed is loaded into the cryptor hardware (FIG. 9) and used to initialize the sequential logic 288 of the cryptor hardware (via gates 287, 289) at the beginning of each field of audio information.

Two levels of synchronization between the encryptor and decryptor must be met for error free data recovery. First, the sequential logic of the encryptor and decryptor must be synchronized down to the bit level. Second, changes in key and seed information must be synchronized down to the field level.

The cryptor hardware of FIG. 9 is initialized on the leading edge of the first horizontal synchronization pulse transmitted ont he aural carrier amplitude modulation. Initialization is accomplished by transferring key data from the holding latches 276 to the shift registers 278, 280, and 282, from the seed holding latch 274 to its shift register 286, and by initializing the sequential logic 288 to the initial states specified by the key. Subsequent seed and key changes occur based on a countdown scheme by audio field. These changes take place during the same field as sync suppression mode changes. The "countdown" field of the AM tag is described below. The seed and key are loaded into their respective holding latches 274, 276 up to one field in advance of the transfer time, and the hardware handles the transfer during field synchronization.

A 13 bit extension to the standard 16 bit AM tag used in the Jerrold AH-4 headend controller provides transport data related to digital audio. Data is sent amplitude modulated on the TV sound carrier, interspersed with the synchronization recovery timing information. The AM data contains timing pulses synchronized to the suppressed horizontal sync pulses of the scrambled video, as well as data pulses for signal tagging and descrambling specifications. The entire AM pulse train may be time shifted from the associated video program.

Details of the timing of data in the AM pulse train are shown in diagrammatic form in FIGS. 10 and 11. Timing pulses are absent during the vertical interval portion of the television signal, and the first horizontal synchronization pulse present on the AM signal corresponds to line 22 of the video field. Horizontal sync pulses 302 are depicted in the pulse stream 300 of FIG. 10. These pulses are 63 microseconds apart. Horizontal lines are indicated in the timing diagram 310 of FIG. 11 by solid lines 316.

A timing pulse occurs for each horizontal line. During lines 22–53, tag data pulses may occur 20 microseconds after the horizontal sync timing reference. During line 22, a data pulse ("start bit") 312 always occurs, signifying the start of a data frame. During lines 23–53, the presence or absence of a pulse 314 represents a one or a zero in bits 0–30, respectively, of the AM tag.

Table 3 breaks down the component data fields of the AM tag.

TABLE 3

| BITS | FIELD DEFINITION |
| --- | --- |
| 0–7 | Video service code |
| 8–11 | Scrambling mode command |
| 12–15 | Scrambling mode countdown |
| 16–23 | Digital audio encryption data |
| 24–27 | Digital audio data descriptor |
| 28–30 | Companding data identifier |

Bits 0–15 of the AM tag data relate to the video scrambling of the television signal and their use in conventional and well known in the art. The video service code field contains a code used to determine authorization for the video portion of the cable television program. Any non-digital audio subscriber terminal (e.g., those converters already in the field) will be deauthorized for digital audio video programming, and viewing of such programs will be disallowed based on the service code transmitted in bits 0–7.

Bits 28–30 of the tag data indicate whether line 54 of the current video field contains amplitude or frequency companding data. This is necessary because odd fields contain one more line than even fields, and in accordance with the present invention, the companding data alternates between frequency and amplitude data every field. Thus, a companding bit in any given line alternates between amplitude and frequency every two fields. The state of bits 28–30 serve to synchronize the transmitter and receiver with respect to these two parameters. Three bits are used to allow for noise immunity through redundancy. If two or more of the three bits are zero, line 54 contains amplitude data. If two or more of the three bits are set, line 54 contains frequency companding data. Each line contains either amplitude or frequency companding data, and the contents of sequential lines alternate from one line to the next.

Bits 16–23 of the tag data carry data associated with the digital audio program, and is not received by non-digital audio subscriber terminals. Data in the digital audio data field is multiplexed, and the contents of a particular frame is specified by the value in the "digital audio data descriptor field", contained in bits 24–27. Table 4 defines the correspondence between the data descriptor field and the data field.

TABLE 4

| Data Descriptor Bits 24–27 | Data Field Bits 16–23 |
| --- | --- |
| 1111 | Audio Service Code (encrypted) |
| 1110 | Audio Decryption Seed (encrypted) |
| 1101 | Key Usage Spec byte 1 (encrypted) |
| 1100 | Key Usage Spec byte 2 (encrypted) |
| 1011 | Time Shift spec (encrypted) |
| 1010 | Spare 1 |
| 1001 | Checkbyte (clear; previous 7 fields) |
| 1000 | Tag Decryption Key specifier (clear) |
| 0111 | Audio Service Code (encrypted) |
| 0110 | Audio Decryption Seed (encrypted) |
| 0101 | Key Usage Spec byte 1 (encrypted) |
| 0100 | Key Usage Spec byte 2 (encrypted) |
| 0011 | Time Shift Spec (encrypted) |
| 0010 | Spare 2 |
| 0001 | Checkbyte (clear; previous 7 fields) |
| 0000 | Tag Decryption Key specifier (clear) |

The data descriptor field also has the function of specifying when to put a new decryption key, seed, and time shift specification into use. Data fields are sent in a sequentially descending order. When the data descriptor field reaches 0001, the new values are loaded into the decryption circuitry latches, i.e., seed latch 274 and key latch 276 of FIG. 9. When the data descriptor field reaches 0000, the newly loaded values are put into use. The countdown field used for video descrambling timing is implemented in the same way, and is coordinated such that video mode changes occur during the same field as audio parameter changes.

When decrypting the contents of the audio data field, one of two tag decryption keys are used. The one actually used is the one most recently specified in sequence. In other words, when decrypting audio data fields 15–11, the tag decryption key specified in field zero is used. When decrypting audio data fields 7–2, the tag decryption key specified in field eight is used.

An audio control byte contains control parameters used to properly decode the digital audio program, and select the proper channels. This byte is sent in the clear (unencrypted) as part of the AM tag and has the format shown in Table 5.

TABLE 5

| BIT | DESCRIPTION |
| --- | --- |
| 0 | Tag key identifier<br>0 = Tag decryption key<br>1 = Tag decryption key 2 |
| 1 | SAP available<br>0 = not available<br>1 = available |
| 2 | Program Audio on SAP<br>0 = Program audio on L&R channels<br>1 = Program audio on SAP channel |
| 3 | Not used |
| 4 | Not used |
| 5 | Not used |
| 6 | Not used |
| 7 | Not used |

In order to allow change out of the tag decryption key without disturbing the operation of the system, two keys exist. At any one time, only one key is in use, while the other key is systematically changed out in all subscriber terminals. The decryption key currently in use is specified in the tag key identifier field. The SAP available flag indicates the presence or absence of SAP program material. The "program audio on SAP channel" flag specified which channel the program audio resides on; i.e., the mono channel, or the stereo channels.

The audio service code data field indicates the program tier, and is used to determine authorization status for the audio portion of a tuned digital audio program. The audio service code sent in the audio data field is encrypted and must be decrypted prior to evaluation. The tag decryption key to be used is specified in the associated field of audio data by use of the tag key identifier described above.

Two bytes of data specify the key usage for audio decryption. These fields are spent in an encrypted format, and must decrypted using the appropriate tag decryption key prior to evaluation. The two bytes are broken down into four nibbles, each specifying the appropriate key nibble to be used in the associated key section. Table 6 indicates the correspondence between the key usage identifier nibbles and the key nibbles.

TABLE 6

| BYTE | BITS | CORRESPONDING KEY SECTION |
|---|---|---|
| 1 | 0-3 | Key latch bits A-D |
| 1 | 4-7 | Key latch bits E-H |
| 2 | 0-3 | Key latch bits J-M |
| 2 | 4-7 | Key latch bits M-R |

This scheme allows any key nibble to be used in any section of the key latch.

Another byte of data is used for seeding the audio decryption hardware. The audio decryption seed is sent in an encrypted format, and is decrypted using the appropriate tag decryption key. It is put into use when the countdown reaches zero.

The time shift specification byte indicates the lead time between the AM horizontal sync pulse and the appropriate synchronization injection point in the video. The time shift specification is static during a television program, but may change with each program change. A new time shift specification is put into effect when the countdown reaches zero. The time shift specification byte is sent in an encrypted format and is decrypted using the appropriate tag decryption key.

The time shift is calibrated, for example, in 1.8 microsecond increments, where a specification of zero represents no time shift (as in all non-digital audio sync suppression channels), and a one represents a shift of 1.8 microseconds indicating the required delay at the terminal between reception of the AM timing pulse and injection of the synchronization pulse in the video. The maximum allowable time shift is 16 increments.

The check byte data is an eight bit value which, when summed (MODULO 256) with the preceding seven bytes (as sent over the AM tag, encrypted or not) totals zero. The summing process is done using data as sent over the AM tag, prior to decryption. Prior to using any data sent in the audio data field, a valid check byte must be verified.

As already noted, certain frames of the audio data field are sent in an encrypted format using a tag encryption key. Two tap encryption keys exist in the system. At any one time, only one is in use. The other key, while not in use, may be changed out on a terminal by terminal basis by addressing specific terminals over the FM data path. The key to be used to decrypt the tag data is specified by the tag key identifier as described above.

When transmitting a key to a terminal over the FM data path, the headend controller encodes the key with the subscriber terminal signature. The subscriber terminal, prior to using the tag decryption key, decodes it using its signature as described below.

The encrypting and decrypting of tag data delivered over the AM modulated sound carrier data path will now be described. In order to perform encryption and decryption, a bit set in the decryption key indicates that the associated operation should be performed. A clear bit indicates the operation should be ignored. Bit zero is the least significant bit of the encryption key. Table 7 illustrates the sequence of operations to be performed by encryptor 58 (FIG. 3) to encrypt a byte of data for transmission over the AM path.

TABLE 7

| BIT | OPERATION |
|---|---|
| 0 | Swap bits 0 and 5 |
| 1 | Swap bits 2 and 6 |
| 2 | Rotate byte left one position w/o carry |
| 3 | Decrement byte by 1 without carry |

Table 8 illustrates the sequence of operations to be performed in order to decrypt a byte of data.

TABLE 8

| BIT | OPERATION |
|---|---|
| 3 | Increment byte by 1 without carry |
| 2 | Rotate byte right one position w/o carry |
| 1 | Swap bits 2 and 6 |
| 0 | Swap bits 0 and 5 |

As an additional measure of video security for the synchronization suppression scrambling, the digital audio system of the present invention allows a time shift between the sync recovery pulses on the sound carrier and the actual sync position in the video signal. This scheme causes any apparatus which is currently available to subscribers for defeating sync suppression to result in a television picture with incorrect horizontal registration, resulting in a line down the middle of the television picture. The time between the sync recovery pulses which are AM modulated on the sound carrier and the video synchronization may be adjusted from zero to 28.8 microseconds in increments of 1.8 microseconds. The required delay to resynchronize is sent to the subscriber terminal in encrypted format over the AM data stream, as a multiplexed field in the audio tag byte. The specification sent in the tag represents the number of 1.8 microsecond increments to delay.

The time shift specification is static for any particular television program, but may be changed between programs. An audio bit (noise) will occur when the change takes place. A new time shift specification is put into use when the countdown reaches zero. Compatibility with standard sync suppression descramblers which are not used in connection with the present invention can be provided by using a time shift of zero.

Certain data is communicated between the headend controller and the encoder and subscriber terminal using an FM data path. Some of the FM commands are transmitted one-way (e.g., from the headend to the subscriber terminal while others are two-way commands. The one-way commands are SET SIGNATURE, CLEAR ENTRY BUFFER and LOAD QUEUE ENTRY X. The twoway FM commands are SEND QUEUE ENTRY X, SEND ACK/NAK/STATUS, and SEND SIGNATURE. The SET SIGNATURE command is used during initialization to download a signature to a subscriber terminal. The signature is a 14 bit number, randomly assigned to the subscriber terminal, and stored in the nonvolatile memory of the terminal and in the subscriber record maintained by the headend controller. The signature is used as a cryptic key to send sensitive data to the subscriber terminal in a secure manner. The SET SIGNATURE command is a specific command containing two bytes of data.

Additional FM commands are used to control the subscriber digital audio terminals. A SET DIGITAL AUDIO PARAMETERS command is used to download audio and tag decryption keys. The audio decryption keys are a set of eight nibbles, and the tag decryption keys are a set of two nibbles. One data byte is transmitted with the SET DIGITAL AUDIO PARAMETERS command. THis allows transmission in the list format with minimum impact to the system cycle time. The byte is broken down into two fields; namely, a descriptor field (for most significant bits) and a data field (for least significant bits). The descriptor field identifies the specific nibble being downloaded, as defined in Table 9.

TABLE 9

| DESCRIPTOR | DATA FIELD CONTENTS |
| --- | --- |
| 0000 | Audio decryption key 0 |
| 0001 | Audio decryption key 1 |
| 0010 | Audio decryption key 2 |
| 0011 | Audio decryption key 3 |
| 0100 | Audio decryption key 4 |
| 0101 | Audio decryption key 5 |
| 0110 | Audio decryption key 6 |
| 0111 | Audio decryption key 7 |
| 1000 | Tag decryption key 0 |
| 1001 | Tag decryption key 1 |
| 1010 | Not used |
| 1011 | Terminal Control |
| 1100 | Illegal |
| 1101 | Illegal |
| 1110 | Illegal |
| 1111 | Illegal |

The terminal control nibble contains information pertaining to authorization of specific features of the digital audio system. Four bits of control information are downloaded, as illustrated in Table 10.

TABLE 10

| BIT | DESCRIPTION |
| --- | --- |
| 0 | SAP enable/disable<br>0 = disable<br>1 = enable |
| 1 | Stereo enable/disable<br>0 = disable<br>1 = enable |
| 2 | Not used |
| 3 | Not used |

Two version of the SET DIGITAL AUDIO PARAMETERS command are available. The first, a specific version, contains an address and is directed to an individual subscriber terminal. The data byte transmitted with this specific command is encoded. The other version of the set digital audio parameters command is a global command directed to all subscriber terminals. Data transmitted in this version is sent in the clear (i.e., not encoded).

The digital audio parameters are sent over the FM data path in an encoded format, using the terminal signature as a key. The signature is a 14 bit number downloaded during terminal initialization, and is sent as two eight bit bytes. Encryption and decryption of the digital audio parameters can be accomplished using various coding systems as will be appreciated by those skilled in the art. An example of one such coding system is that which results from the following sequence of operations which may be used to encode the parameter byte prior to transmission:

(1) Swap bits 0 and 1, and bits 4 and 5, and leave bits 6 and 7 and bits 2 and 3 in their original positions.

This can be accomplished through the following sequences of operations:

(a) Logically AND the byte with a mask pattern of 00100010, and shift the resultant byte right one position. Store for further use.

(b) Logically AND the original data byte with a mask pattern of 00010001, and shift the result left one position. Logically OR the result of this operation with the result of the operation in (a) above, and store for further use.

(c) Logically AND The original data byte with a mask pattern of 11001100, and logically OR the result of this operation with the result of (b) above.

(2) Exclusive NOR result from 1 above with signature byte 1.

(3) Exclusive OR result from 2 above with signature byte 2.

(4) Clear MSB of result.

In order to decrypt the parameter data encoded using the above sequence of operations, the following sequence is performed;

(1) Exclusive OR with signature byte 2.

(2) Exclusive NOR result from 1 above with signature byte 1.

(3) Swap bits 0 and 1 and bits 4 and 5, and leave bits 2 and 3 and bits 6 and 7 in their original positions. This can be accomplished using the same algorithm described in step 1 of the encryption sequence.

(4) Clear MSB of result.

The various information and control information provided from the headend controller to subscriber terminals can provide a variety of options in enabling or disabling receipt of the various video and audio program signals transmitted over the cable television network. For example, the "program audio on SAP channel" flag sent in the control byte of the audio tag extension indicates whether the SAP or stereo right and left channels are to be considered the primary audio program available to the subscriber. If the flag is set, for example, the SAP channel can be considered primary audio, and the left and right stereo channels secondary. If the flag is clear, then the stereo left and right channels would be considered primary audio and the SAP channel secondary.

Two service codes are transmitted in the digital audio tag, one for video and one for audio. Through the use of the program audio on SAP channel flag and the video and audio service codes, a subscriber terminal can be authorized to provide a video program and allow audio from either the stereo or SAP channels, to disallow video but allow audio from either the SAP or stereo channels, or to allow video together with reception of both the SAP and stereo channels, at the subscriber's option.

Referring again to FIG. 3, all audio and control data encrypted by encryptor 58 is output by the encryptor in serial form to a two bit serial to parallel converter 60. Timing logic 68 provides a clock at 22 $f_H$ to converter 60 which outputs the data in two bit parallel format to a multiphase modulator 62. The multiphase modulation provided by modulator 62 is similar to quadrature phase shift keyed ("QPSK") modulation but with the addition of a fifth phase reference point. Timing logic 68 provides a clock at the horizontal line frequency $f_H$ to modulator 62. Modulator 62 is also provided with the 4.5 MHz sound carrier frequency on which the audio data is modulated.

Multi-phase modulator 62 is used to modulate the digital audio data. One audio frame of data is transmitted for each video line. The audio frame contains 22 symbols of two bits each, or 44 bits. The timing of the 22 symbols on each horizontal line is established by the 22 $f_H$ timing signal input to serial to parallel converter 60.

Figure 7:
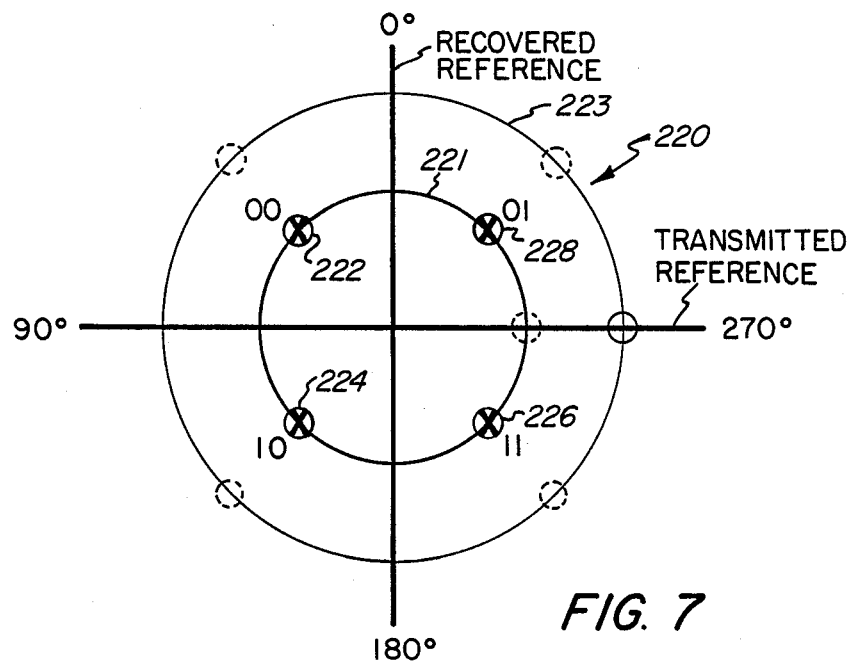
FIG. 7 is a polar diagram illustrating the multi-phase modulation technique used in accordance with the present invention.

The first four bits in the audio frame are defined as the reference for demodulating the remaining bits. The reference is transmitted during the first two symbol periods of the line with an amplitude 6 dB greater than the amplitude of the remaining bits. The polar diagram 220 of FIG. 7 depicts the phase of the transmitted reference signal as well as the bit values for each phase quadrant. As shown, the transmitted reference and recovered reference are 90 degrees apart. This is the phase lock loop ("PLL") stable point (i.e., the point where the PLL will lock).

As shown in FIG. 7, the audio data is modulated such that each two bit symbol appears in a different quadrant, each 45 degrees from the axes of the polar diagram. The rightmost bit in each of the two bit symbols is shifted out of the transmitting shift register first, and into the receiving shift register first. There are ten possible data points used in polar diagram 220. Five of the data points occur on inner circle 221 (representing the normal amplitude of the carrier signal), and the remaining five data points are present on outer circle 223 (representing AM modulated data at an amplitude of 6 dB higher than the normal carrier amplitude). Two of the ten data points correspond to the transmitted reference signal (also referred to as a pilot signal) and the remaining eight data points correspond to the multiphase modulated audio data. In the subscriber terminal which receives the modulated audio data, the AM detector differentiates between the presence and absence of a data bit by detecting whether the signal is at the level of the inner circle 221 (a binary zero) or at the level of outer circle 223 (a binary one). The phase of the data does not matter to the AM detector.

Conversely, the phase detector which recovers the digital audio signal does not look at the amplitude of the signal, but rather detects the phase thereof to determine the actual data contained in each of the two bit symbols (i.e., either 00, 01, 10, or 11, depending on the quadrant in which the data appears). The multiphase modulated digital audio data will commonly occur on inner circle 221 during each horizontal line. The only exception is immediately after the vertical interval, where the data will appear on outer circle 223. The pilot signal (transmitted reference) is comprised of AM modulated data appearing on outer circle 223. The commonly occurring data points in FIG. 7 are represented by solid circles and the infrequent data points (those occurring during the vertical interval) are shown by dashed circles.

Once the digital audio data is multiphase modulated, it is then output from multiphase modulator 62 to an AM modulator 64 where it is remodulated on the 4.5 MHz sound carrier of the television signal. Data from headend controller 50 which is not encoded by encryptor 58 is passed by microprocessor 52 directly to AM modulator 64 for modulation on the sound carrier. Thus, the digital audio information is carried on the sound carrier using multiphase modulation, whereas the video vertical and horizontal framing, as well as the audio carrier phase reference pilot signal, audio data bit time and frame reference, program identifications and decryption seeds are carried on the sound carrier using AM modulation. AM modulator 64 receives the horizontal scanning frequency $f_H$ from timing logic 68 for use in a conventional manner. The video and horizontal framing information is input to AM modulator 64 from a standard sync separator 80 having been delayed by a delay 84, which is used to synchronize the video signal with the audio carrier phase pilot signal. Since different video transmitters will have different inherent delays, it is preferable that delay 84 be a variable delay as well known in the art in order to adjust the delay provided thereby for proper synchronization of the audio and video signals. The combined multi-phase and AM modulated digital audio data replaces the FM modulated audio data which is normally provided on the 4.5 MHz sound carrier of a television signal.

A phase comparator 76, low pass filter 78, and voltage controlled oscillator 70 combine to provide a phase lock loop to maintain the proper horizontal frequency. Voltage controlled oscillator 70 runs at 18 MHz and the output thereof is divided by a factor of four at a first divider 72 to provide the 4.5 MHz frequency at which the sound carrier is centered and again divided by a factor of 286 at divider 74 to provide the horizontal frequency $f_H$. The 18 MHz output of voltage controlled oscillator 70 is also input to timing logic 68 so that the various timing signals related to the horizontal frequency can be generated.

A standard 4.1 MHz low pass filter 82, video modulator and scrambler 86, and vestigial filter 88 are provided for modulating and scrambling the video signal in a conventional manner. A 45.75 MHz oscillator 90 provides the standard intermediates frequency (IF) to the video modulation circuitry.

The IF frequency is mixed at mixer 92 with the modulated audio and control signals output from AM modulator 64 after being filtered by 4.5 MHz bandpass filter 66. This produces a sound carrier at the standard intermediate frequency of 41.25 MHz. A 41.25 MHz bandpass filter 94 filters the sound carrier which is subsequently combined at a combiner 96 with the modulated video signal from vestigial filter 88. The composite IF signal is amplified by an amplifier 98 and input to a conventional channel upconverter 100 for conversion to an Rf signal. The RF output of channel upconverter 100 is input to a standard headend combiner 102 where it is combined with similar RF signals on inputs 103 from other television channels to be transmitted by the headend and with the FM data output from FM modulator 104. The output of the headend combiner, on terminal 105, is the cable output signal which is sent via the cable system to individual subscriber terminals. Those skilled in the art will appreciate that the RF output signal on terminal 105 can also be transmitted by antenna or other means known in the art for reception by a subscriber terminal.

Figure 4:
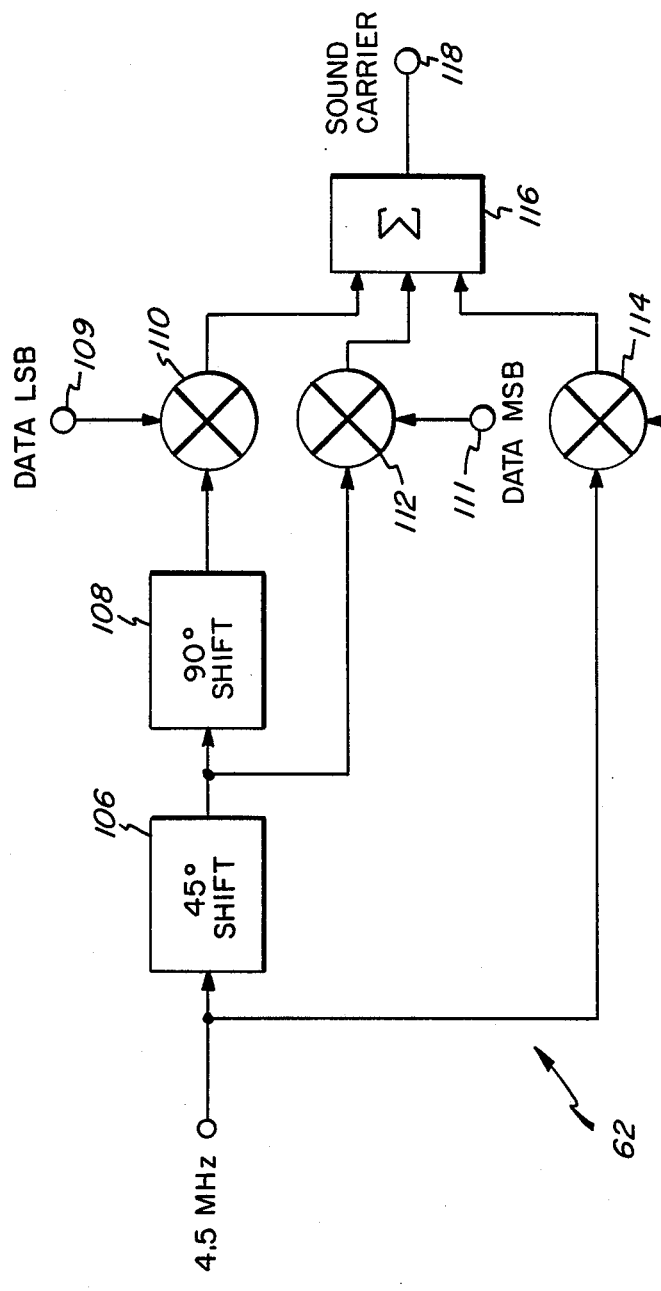
FIG. 4 is a block diagram of a multi-phase modulator for use in modulating the digital audio information in accordance with the present invention.

The multiphase modulator 62 of FIG. 3 is shown in greater detail in FIG. 4. The 4.5 MHz signal output from divider 72 (FIG. 3) is phase shifted by 45 degrees by a conventional phase shifter 106 (FIG. 4) and input to a mixer 112 to modulate the most significant bit of the two bit digital audio data input at terminal 111. The 4.5 MHz signal is also shifted an additional 90 degrees at conventional phase shifter 108 for modulating at balanced modulator 110 with the least significant bit digital audio data input at terminal 109.

The 4.5 MHz signal is also directly input to balanced modulator 114 where it is modulated with the phase and timing reference pilot signal input at termint terminal 113.

The output signals from each of modulators 110 (LSB data), 112 (MSB data), and 114 (phase and timing reference pilot) are all summed in a conventional summing circuit 116 to produce the sound carrier at terminal 118.

Figure 5:
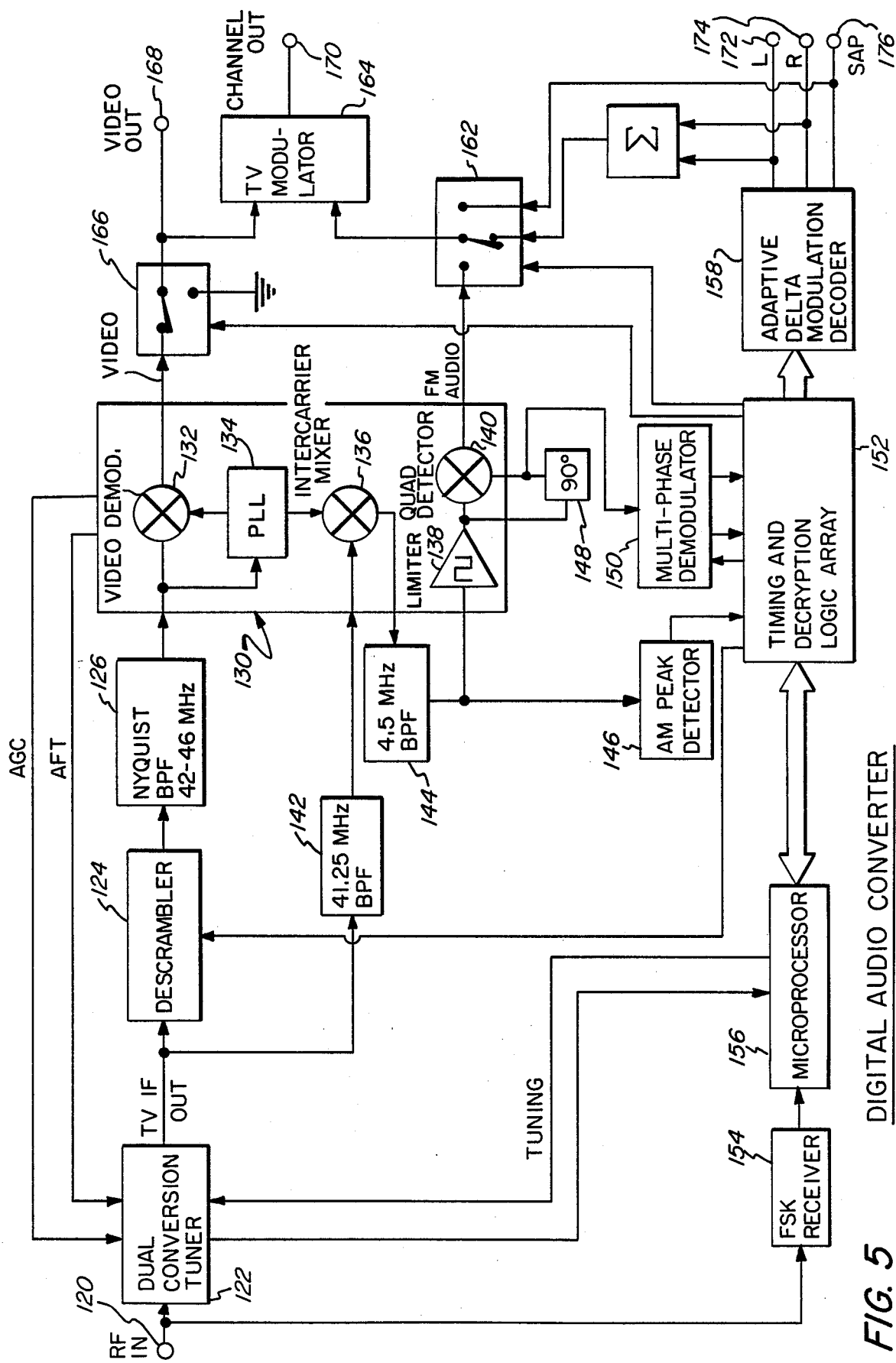
FIG. 5 is a block diagram of a cable television converter for receiving and reproducing television signals with digital audio data in accordance with the present invention.

FIG. 5 is a block diagram of a digital audio converter (contained in a subscriber terminal) used to receive a television signal modulated with digital sound in accordance with the present invention and to produce audio output signals from the television signal. The television signal, which is transmitted by conventional radio frequency (RF) techniques such as over a cable television system, is input at terminal 120. All FM control signals (e.g., subscriber terminal address signals, terminal signature, encryption keys and specifiers, control parameters, audio and video service codes, and program authorization data) were detected by FSK receiver 154 and output to microprocessor 156 which processes the control signals in a conventional manner. Microprocessor 156 is also used to tune a dual conversion tuner 122 that tunes to specific television programs carried in the broadband RF signal input at terminal 120. The construction and use of dual conversion tuners in the television industry is well known.

Dual conversion tuner 122 outputs a composite IF television signal for each television channel which is tuned. The composite IF outputs correspond to those produced at the digital audio headend shown in FIG. 3. The video portion of a composite IF signal is descrambled at a conventional descrambler 124 and filtered by a conventional Nyquist bandpass filter 126 having a passband of 42–46 MHz. The filtered signal from bandpass filter 126 is demodulated by a standard demodulator circuit 130 which contains a video demodulator 132 and phase lock loop 134 to produce a video output signal at terminal 168 in a conventional manner. Circuit 130 can comprise, for example, an integrated circuit chip manufactured by Mitsubishi, Inc. and designated as model no. M51365SP. A switch 166 controlled by microprocessor 156 via timing and decryption logic array 152 prevents a subscriber from receiving a video program which is not authorized. In such an instance, video output terminal 168 is grounded by switch 166 so that no video signal will be output to a subscriber's television set if unauthorized. A television modulator 164 modulates the video output signal present at terminal 168 to provide an RF output signal at terminal 170 in the event the subscriber's television does not have an input to receive the video output signal directly from terminal 168.

The processing of the audio portion of the television signal will now be described. A television IF output signal from dual conversion tuner 122 is input to a 41.25 MHz IF bandpass filter 142. The output of this filter is mixed in intercarrier mixer 136 with the output signal from phase lock loop 134. This recovers the 4.5 MHz sound carrier, which is filtered by a 4.5 MHz bandpass filter 144. The output from filter 144 is input to an AM peak detector 146 which recovers the phase and timing reference pilot signal that is necessary to demodulate the multi-phase modulated digital sound data. The pilot signal detected by AM peak detector 146 is input to timing and decryption logic array 152 which provides timing signals to multi-phase demodulator 150.

The sound carrier from bandpass filter 144 is also input to a digital limiter 138 contained in demodulator circuit 130 that limits the amplitude of the input signal, thereby removing the AM modulated components. The output of limiter 138 is input to a quadrature detector 140 contained in demodulator circuit 130 which detects the audio signal and outputs it to multi-phase demodulator 150. Detector 140 will also detect a standard FM audio signal, if input at RF input terminal 120 of the subscriber terminal, so that the subscriber terminal will work with television signals without digital sound. In such an instance, switch 162 is switched to coupled the FM audio output signal to TV modulator 164 where the conventional audio signal is modulated together with the video signal for output to a television on terminal 170. A 90 degree phase shift circuit 148 (typically an L-C tank circuit) is provided externally to demodulator circuit 130 and is necessary for the operation of quadrature detector 140.

When the subscriber terminal of FIG. 5 is used to receive a television signal containing digital audio in accordance with the present invention, the detected audio signal is tapped prior to 90 degree phase shift circuitry 148 for input to multi-phase demodulator 150. Multi-phase demodulator 150 recovers the digital data from the modulated sound carrier. The recovered data is input to timing and decryption logic array 152, which outputs it to adaptive delta modulation decoder 158 for recreation of the original analog sound channels. The left and right stereo sound channels appear at terminals 172 and 174, respectively. The SAP sound channel appears at terminal 176. In order to accommodate subscriber television sets that do not have separate audio channel inputs, the left and right stereo channel signals are summed by conventional summing circuit 160 and coupled to TV modulator 164 for input in RF form to the user's television set via terminal 170. Those skilled in the art will appreciate that the SAP output signal on terminal 176 could similarly be coupled via modulator 164 to a user's television set.

Figure 6:
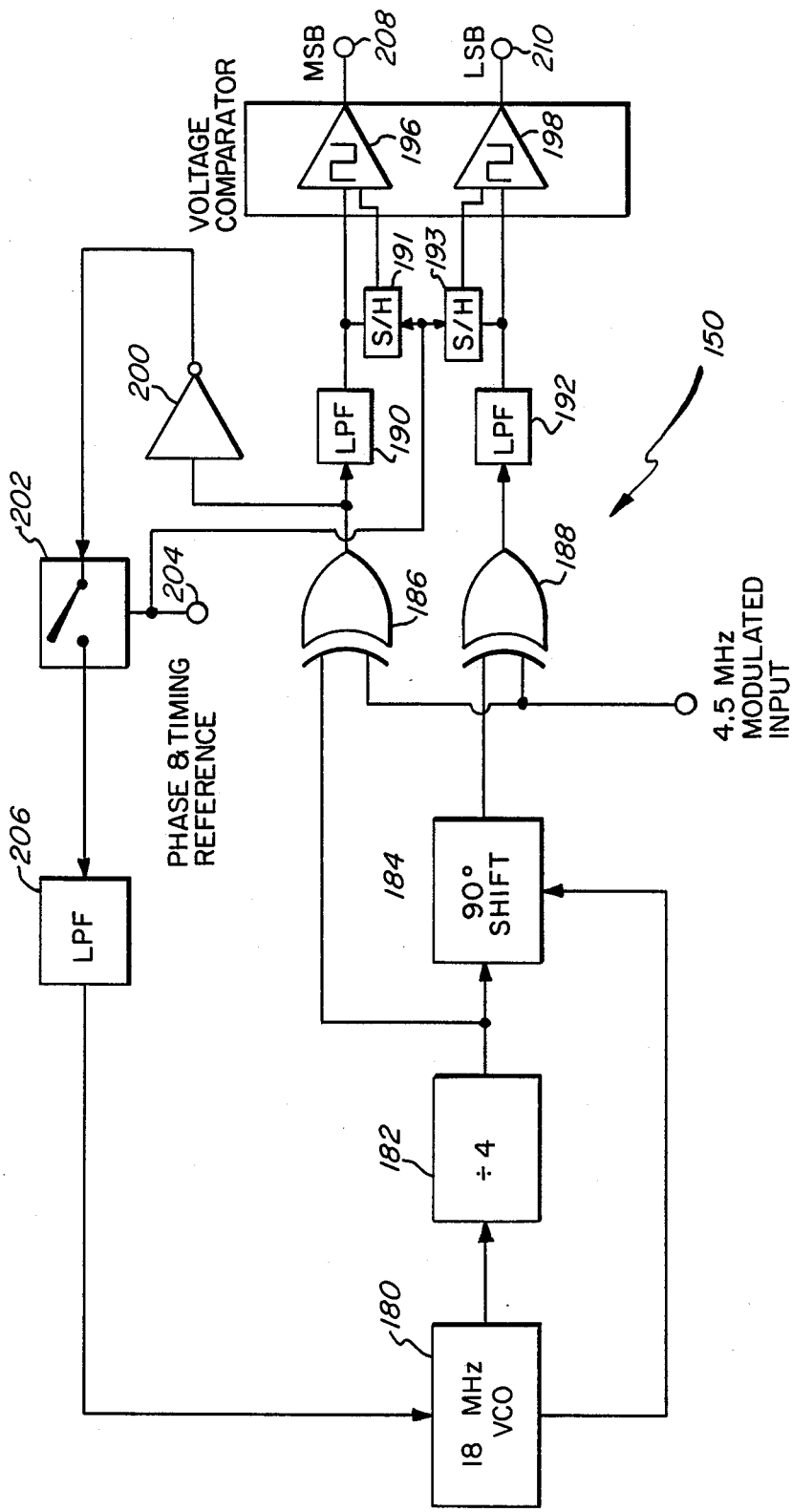
FIG. 6 is a block diagram of a multi-phase demodulator for use in the converter shown in FIG. 5.

Multi-phase demodulator 150 is shown in greater detail in the block diagram of FIG. 6. A 4.5 MHz signal is created by dividing the output of an 18 MHz voltage controlled oscillator 180 by four at divider 182. The 4.5 MHz signal is input directly to a first phase comparator (exclusive OR gate) 186 and to a second phase comparator 188 after being shifted 90 degrees by a conventional phase shift circuit 184. The other inputs of each of phase comparators 186 and 188 are coupled to the 4.5 MHz modulated sound carrier which is to be demodulated by the multi-phase demodulator. Phase comparator 186 will demodulate the most significant bit of each symbol of the digital audio data and phase comparator 188 will demodulate the least significant bit of each symbol which is 90 degrees out of phase with the most significant bit. A low pass filter 190 filters the output of phase comparator 186. Similarly, a low pass filter 192 filters the output of phase comparator 188. The filtered outputs from the low pass filters 190, 192 are sampled and held by sample and hold circuits 191 and 193, comparatively. These signals are sampled in synchronization with the phase and timing reference pilot signal. The sampled signals are output from the sample and hold circuits to a voltage comparator 196 for resolving the most significant bit and voltage comparator 198 for resolving the least significant bit. Sample and hold circuits 191 and 193 are well known, and can comprise, for example, a capacitor which is charged during the sampling time to establish a DC level, followed by an FET operational amplifier. Comparator 196 compares the output of low pass filter 190 to the DC reference established by sample and hold circuit 191 and outputs the most significant bit on terminal 208. Similarly, comparator 198 compares the output of low pass filter 192 to the DC level established by sample and hold circuit 193 and outputs the least significant bit on terminal 210.

An inverter 200 is coupled to the output of phase comparator 186, and is fed back via switch 202 and a low pass filter 206 to voltage controlled oscillator 180. Switch 202 is closed in response to the phase and timing reference pilot signal thereby providing the phase lock control signal to voltage controlled oscillator 180.

The output of the multi-phase demodulator 150 (FIG. 5) is input to timing and decryption logic array 152 which decrypts the data in accordance with the procedures set forth above and separates the data into six serial bit streams for input to adaptive delta modulation decoder 158. The six serial streams are the same as those shown in Table 1 above. Four of the 44 bits recovered in each horizontal line by the multi-phase demodulator are unused by adaptive delta modulation decoder 158. These four bits are those relating to the phase lock and timing functions previously described.

FIG. 8 depicts the waveforms in the time domain of the multi-phase modulated and detected signals. Waveform 230 is the 4.5 MHz multi-phase modulated input signal. Carrier 232 is the sound carrier having a center frequency of 4.5 MHz. This carrier is AM modulated with the phase and timing reference pilot signal as shown at 234, the peak AM amplitude being 6 dB above the standard AM modulation shown at 236. The multi-phase modulation of sound carrier 232 is indicated at 237, and contains the digital audio data.

Waveform 238 shows the detected peak AM modulation which produces the phase and timing reference pilot signal 240.

Waveform 242 illustrates the detected most significant bit data. A high bit level (e.g., a "1") is shown at 244 and a low bit level (e.g., a "0") is shown at 246.

The detected least significant bit data is illustrated in waveform 248. A high bit is shown at 252 and several low bits are shown at 254.

The space between points "X" and "Y" in axis 250 represents one horizontal line of the television signal. Twenty-two symbol periods (44 bits of multiphase modulated data) are contained within each horizontal line.

It should now be appreciated that the present invention provides a television transmission system for providing digital sound and which can be used in conjunction with a cable television network wherein the video signal is scrambled. Three digital audio channels are time division multiplexed on the audio carrier, using combined multi-phase and AM modulation. The analog audio signals are digitized in the preferred embodiment using adaptive delta modulation.

Although a single preferred embodiment has been described herein, those skilled in the art will recognize that various adaptations and modifications may be made thereto, without departing from the spirit and scope of the present invention as defined in the following claims.

I claim:

1. A method for providing a digital audio signal in a sound carrier portion of an approximately 6 MHz radio frequency channel of a television signal, said sound carrier portion located outside of an approximately 4.25 MHz band width video portion of said radio frequency channel, said method comprising the steps of:
   generating a video signal having an approximately 4.25 MHz band width for inclusion in said channel,
   generating a digitized audio signal associated with the video signal;
   modulating the digitized audio signal using multi-phase modulation on a sound carrier for inclusion in said channel;
   summing the modulated sound carrier and the video signal in an approximately 6 MHz band to produce a composite output signal, said sound carrier being located outside of the video band in said 6 MHz band; and
   transmitting the sum in said 6 MHz radio frequency channel for receipt by a video appliance.

2. The method of claim 1 comprising the further step of amplitude modulating the sound carrier with a pilot signal for use as a phase reference in the multi-phase modulated signal.

3. The method of claim 2 wherein said pilot signal comprises a pulse added to the sound carrier once for each horizontal line contained in a television signal.

4. The method of claim 3 wherein said pilot signal is added to a portion of the sound carrier corresponding to the end of active video on each horizontal line.

5. The method of claim 3 wherein said pulse comprises a portion of the sound carrier which is modulated at approximately twice the amplitude of the remainder of the sound carrier.

6. The method of claim 1 wherein said composite output signal is provided at an intermediate frequency, and said transmitting step comprises the steps of:
   converting said composite intermediate frequency output signal to an RF output signal; and
   transmitting said RF output signal on said 6 MHz radio frequency channel.

7. The method of claim 1 wherein
   said video signal includes a luminance portion; and
   a whole number of data bits in the modulated sound carrier are transmitted per horizontal video scan, and said modulation is synchronized with a horizontal video scan rate such that a frequency spectra of the modulated sound carrier is registered with a frequency spectra of said luminance portion.

8. The method of claim 7 wherein said video signal also includes a standard chromanance portion having a frequency spectra interleaved with the frequency spectra of said luminance portion.

9. The method of claim 7 wherein said audio signal is digitized using adaptive delta modulation.

10. The method of claim 9 wherein the sound carrier center frequency is phase locked to the horizontal scan rate to maintain said center frequency at a value which is the product of the horizontal scan rate and an integer value.

11. The method of claim 10 wherein the adaptive delta modulation uses an audio sampling rate which is the product of said horizontal scan rate with an integer factor of said integer value.

12. The method of claim 11 wherein said horizontal scan rate is approximately 15.734 kilohertz, said sound carrier center frequency is approximately 4.50 megahertz and said video band extends from a lower end of the channel to approximately 4.25 MHz.

13. The method of claim 12 wherein said adaptive delta modulation sampling rate is thirteen times the horizontal scan rate.

14. The method of claim 12 wherein said digitized audio signal comprises three time division multiplexed audio channels, and said digitizing step includes the steps of:
   sampling the first and second of said audio channels at an adaptive delta modulation rate of thirteen times the horizontal scan rage; and
   sampling the third of said audio channels at an adaptive delta modulation rate of eleven times the horizontal scan rate.

15. The method of claim 14 comprising the further steps of:
   alternately sampling frequency and amplitude companding data in each of said first, second and third audio channels at a sampling rate of one-half the horizontal scan rate.

16. The method of claim 2 wherein the multiphase modulated digital audio data uses four symbol periods having phase angles from said phase reference of approximately 45 degrees, 135 degrees, 225 degrees, and 315 degrees, respectively.

17. The method of claim 16 wherein two bits of data are provided in each symbol period.

18. The method of claim 17 wherein each horizontal line in a television signal is provided with 22 two bit symbols of multi-phase modulated audio data corresponding to three separate audio channels.

19. The method of claim 1 comprising the further step of serially encrypting the digitized audio signal to deter unauthorized reception and reproduction of an audio program therefrom.

20. The method of claim 19 comprising the further step of:
   amplitude modulating said sound carrier with video vertical and horizontal framing information, a pilot signal for use as a phase reference in the multiphase modulated signal, television program identification data, and decryption seeds.

21. The method of claim 1 wherein the generated digitized audio signal is high fidelity.

22. Headend apparatus for providing a digital audio signal in a sound carrier portion of an approximately 6 MHz channel of a transmitted television signal, said sound carrier portion located outside of an approximately 4.25 MHz band width video portion of said radio frequency channel, said apparatus comprising:
   means for generating a video signal having an approximately 4.25 MHz band width for inclusion in said channel;
   means for generating a high fidelity, digital audio signal;
   means coupled to receive a digital audio signal from the digital audio generating means, for modulating the digital audio signal on a sound carrier for inclusion in said channel adjacent to the video band without the modulated sound carrier being impaired by said video signal;
   means coupled to receive the modulated sound carrier for converting the modulated sound carrier to an intermediate frequency; and
   means coupled to receive the converted modulated sound carrier signal from said converting means and to receive the video signal from a video signal path for summing the converted modulated sound carrier signal with the video signal, thereby producing a composite output signal and transmitting the sum in said channel to a video appliance, said sound carrier being located outside of the video band within said channel.

23. The apparatus of claim 22 wherein the modulating means multi-phase modulates the digital audio signal and further comprising:
   means for producing a pilot signal for use as a timing and phase reference for the multi-phase modulated signal; and
   means for amplitude modulating said pilot signal on said sound carrier.

24. The apparatus of claim 23 wherein said pilot signal is modulated on said sound carrier once for each horizontal line contained in a television signal.

25. The apparatus of claim 24 wherein said pilot signal is added to a portion of said sound carrier corresponding to the end of active video on each horizontal line.

26. The apparatus of claim 25 wherein said pilot signal is modulated on said sound carrier at an amplitude of approximately twice the amplitude of the remainder of the sound carrier.

27. The apparatus of claim 22 further comprising:
   means for scrambling the video portion of said television signal by suppressing horizontal synchronization pulses in the video portion.

28. The apparatus of claim 22 wherein said audio signal is digitized using adaptive delta modulation and the modulating means provides multi-phase modulation of the digital audio signal.

29. The apparatus of claim 28 further comprising:
   means for phase locking the center frequency of the sound carrier to a horizontal scan rate used in reproducing the video portion of said television signal to maintain said center frequency at a value which is a product of the horizontal scan rate and an integer value.

30. The apparatus of claim 29 wherein said digitizing means uses an adaptive delta modulation sampling rate which is the product of said horizontal scan rate with an integer factor of said integer value.

31. The apparatus of claim 30 wherein said horizontal scan rate is approximately 15.734 kilohertz, and said sound carrier center frequency is approximately 4.50 megahertz.

32. The apparatus of claim 31 wherein said digitizing means uses an adaptive delta modulation sampling rate of 13 times the horizontal scan rate.

33. The apparatus of claim 31 wherein said digitized audio signal comprises three time division multiplexed audio channels, and said digitizing means comprises:
   means for sampling the first and second of said audio channels at an adaptive delta modulation rate of 13 times the horizontal scan rate; and
   means for sampling the third of said audio channels at an adaptive delta modulation rate of 11 time the horizontal scan rate.

34. The apparatus of claim 33 wherein said digitizing means further comprises:
   means for alternatively sampling frequency and amplitude companding data in each of said first, second and third audio channels at a sampling rate of one-half the horizontal scan rate.

35. The apparatus of claim 22 further comprising:
   means coupled to receive said digital audio signal from said digitizing means and convert it to a two bit parallel output data stream for input to said modulating means.

36. The apparatus of claim 35 further comprising:

means coupled to said digitizing means for serially encrypting said digital audio signal to deter unauthorized reception and reproduction of an audio program therefrom.

37. The apparatus of claim 36 further comprising:
means for amplitude modulating said sound carrier portion of the television signal with video vertical and horizontal framing information, a pilot signal for use as a phase reference in the modulated signal, television program identification data, and decryption seeds.

38. The apparatus of claim 22 wherein:
said video signal includes a luminance signal; and
a whole number of modulated digital audio signal bits are transmitted per horizontal video scan, and the modulating means synchronizes the modulation with a horizontal scan rate of said video signal such that a frequency spectra of the modulated sound carrier is registered with a frequency spectra of said luminance signal.

39. A converter for providing reproduction of digital television in a sound carrier portion of an approximately 6 MHz channel of a television signal, the channel also including a video signal having an approximately 4.25 MHz band transmitted simultaneously with said digital television sound, said sound carrier portion located outside of the video signal band within said channel of a television signal, said converter comprising:
a tuner for receiving said channel of the television signal;
detector means coupled to the output of said tuner for detecting a digital audio signal from a modulated sound carrier having a center frequency within said channel outside of said video band without impairment by the simultaneously transmitted video signal;
demodulator means coupled to receive the detected digital audio signal for demodulating the detected digital audio signal to produce digital audio data;
decoding means for converting the demodulated digital audio data to an analog audio signal; and
means for outputting said analog audio signal to a television set.

40. The converter of claim 39 wherein said decoding means comprises an adaptive delta modulation decoder which provides left and right stereo audio output signals.

41. The converter of claim 40 further comprising:
means for summing the left and right stereo audio output signals from the adaptive delta modulation decoder;
means coupled to receive the summed left and right stereo audio output signals and a video signal for combining the audio and video signals; and
means for RF modulating the combined video and audio signals for input to a television set.

42. The converter of claim 39 wherein
said detector means is capable of outputting a detected analog audio signal present on a television signal to which said tuner is tuned, and
further comprising switch means coupled to receive either an analog audio signal from said detector means or an analog audio signal from said decoding means for selectively inputting one of said analog audio signals to a television set.

43. The converter of claim 39 further comprising:
FM receiver means coupled to receive transmitted data signals for recovering data necessary to decrypt the digital audio signals; and
decryption means, coupled to receive the decryption data from the FM receiver means, for decrypting digital audio data recovered by said demodulator means.

44. The converter of claim 39 wherein said demodulator means provides multi-phase demodulation and further comprising:
AM peak detector means for recovering a pilot signal from the audio signal portion of a television signal tuned by said tuner; and
means for coupling the detected pilot signal to said multi-phase demodulator means for use as a demodulator phase and timing reference.

45. The converter of claim 39 wherein said demodulator means is synchronized with a horizontal video scan rate, and said decoding means is adapted to decode a whole number of digital audio signal bits per horizontal video scan.

46. The converter of claim 39 wherein said demodulator means provides multi-phase demodulation to produce high fidelity digital audio data.

47. The converter of claim 39 wherein said video signal is a standard video signal, and said detector means detects a digital audio signal modulated on an approximately 4.5 MHz sound carrier.

* * * * *